United States Patent [19]

Handte

[11] 4,265,024
[45] May 5, 1981

[54] JIG FOR STORING ADJUSTMENT POSITIONS

[75] Inventor: Herbert Handte, Filderstadt, Fed. Rep. of Germany

[73] Assignee: Moog GmbH, Boblingen, Fed. Rep. of Germany

[21] Appl. No.: 135,309

[22] Filed: Mar. 31, 1980

[30] Foreign Application Priority Data

Apr. 18, 1979 [DE] Fed. Rep. of Germany ....... 2915668

[51] Int. Cl.³ .............................................. G01B 5/20
[52] U.S. Cl. .................................. 33/175; 33/174 PA
[58] Field of Search .............. 33/175, 174 PA, 174 P, 33/51 R

[56] References Cited

U.S. PATENT DOCUMENTS

| | | | |
|---|---|---|---|
| 2,266,457 | 12/1941 | Wolff | 33/175 |
| 2,621,415 | 12/1952 | Cooper | 33/175 |
| 3,805,294 | 9/1957 | Edmunds | 200/51 R |

Primary Examiner—Willis Little
Attorney, Agent, or Firm—Sommer & Sommer

[57] ABSTRACT

A jig is provided for storing setting data of apparatus having a plurality of adjacent slidable setting members. The positions of the members relative to the frame and to each other determines the setting data of the apparatus. The jig includes a plurality of bars mounted on a frame for independent sliding movement relative thereto, and a set screw for releasably holding the bars in desired positions. Each bar has an end face arranged to be selectively contacted by an aligned setting member.

5 Claims, 3 Drawing Figures

U.S. Patent  May 5, 1981  Sheet 2 of 2  4,265,024
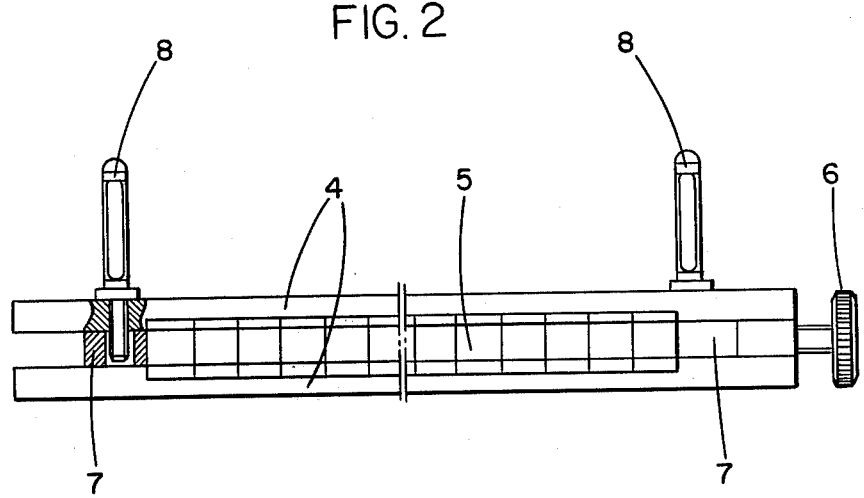
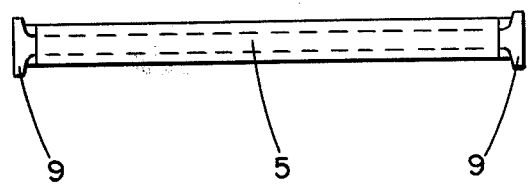

JIG FOR STORING ADJUSTMENT POSITIONS

BACKGROUND OF THE INVENTION

In certain types of apparatus having means for adjustably setting a major number of data, it is sometimes required to reproduce a once-established combination of set valves or adjustment positions. Such apparatus may include a large number of juxtaposed or adjacent slide buttons adapted to move along parallel paths.

For example, in the programmer for timing the control of a mandrel of an extruder in blow-molding apparatus, program data is established by adjusting the positions of a number of juxtaposed slide potentiometers. The settings established by these potentiometers establishes the wall thickness of the extruded parison at various points along its extruded extent. This wall thickness program has to be accurately reproduced by exactly resetting the slide potentiometers, if a given blow-molded body is to be produced again after an interruption by a different program.

In order to duplicate a once-established program, it is of course possible to read and record the positions of the various slide buttons on the potentiometers, in order to reset them to these same positions at a later time. However, such reading, recording and resetting is both troublesome and inaccurate.

To facilitate this resetting step, it is already known to employ a jig made from a sheet of aluminum. Such a jig has been formed to have a plurality of slots, each of which accommodates motion of one potentiometer slide button. The depth of each slot determined the extent of travel of the associated button. Usually, the designed depth of the slot was determined by measurement. This lead to errors and inaccuracies, particularly if the slot was formed to have a depth greater than desired. Another disadvantage was that a separate jig was needed for each different program. It was only practical to modify an existing program by lengthening the extent of the slots.

SUMMARY OF THE INVENTION

The present invention provides an improved jig for storing set data of an apparatus, such as the programmer for controlling the manrel of a blow-molding machine. Such apparatus has a plurality of adjacent slidable setting members, the relative positions of which determine the set data of the apparatus.

The improved jig broadly includes: a frame; a plurality of bars mounted on the frame, the bars being positioned adjacent one another for independent sliding movement relative to the frame along parallel paths, each of the bars having an end face aligned with and arranged to contact or abut a corresponding one of the setting members; and clamp means, such as a set screw, mounted on the frame and arranged to releasably hold the bars in desired positions relative to one another and to the frame.

Accordingly, one object of the present invention is to provide an improved jig for use with apparatus having a plurality of slide buttons.

Another object is to provide such an improved jig which may be adjusted or modified to accommodate different programs.

These and other objects and advantages will become apparent from the foregoing and ongoing specification, the drawings, and the appended claims.

BRIEF DESCRIPTION OF THE DRAWINGS

FIG. 2 is a top plan view of the improved jig, with the apparatus removed.

FIG. 3 is a transverse side elevational view of one of the bars, this view being oriented ninety degrees counterclockwise.

DESCRIPTION OF THE PREFERRED EMBODIMENTS

Figure 1:
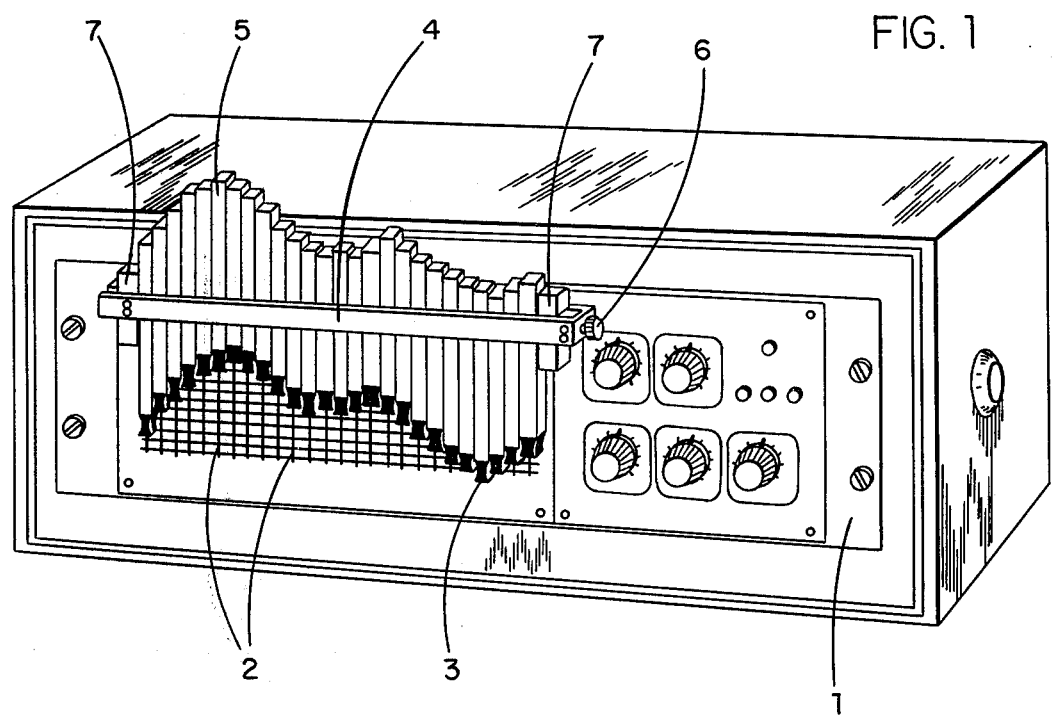
FIG. 1 is a perspective view of the improved jig operatively positioned on the face of extrusion control apparatus having some twenty-five slide buttons, the relative positions of which indicate the wall thickness of the parison to be extruded.

At the outset, it should be clearly understood that like reference numerals are intended to identify the same elements and/or structure consistently throughout the several drawing figures, as such elements and/or structure may be further described or explained by the entire written specification, of which this detailed description is an integral part.

Referring now to the drawing figures, and more particularly to FIG. 1 thereof, the apparatus is shown as being a program controller having a front plate 1 provided with twenty-five horizontally-spaced vertical slots 2. Slide buttons 3 are mounted on arms or levers projecting through slots 2, and are connected to potentiometers within the apparatus.

Affixed to front plate 1 is a jig having a frame defined by two horizontally-spaced elongated rails 4, 4 which extend across the slots. Twenty-five bars are captured between rails 4, 4 for independent sliding movement along parallel vertical paths. Disposed adjacent one end of the rails is a clamping means, such as a set screw 61, which may be selectively operated to clamp the bars together. The bars 5 are caused to slide in parallel vertical paths by means of guide bars 7 provided between the opposite end portions of the rails.

Projecting rearwardly from the rail adjacent the apparatus are two positioning pins 8, 8 (FIG. 2), which are adapted to be inserted into corresponding holes (not shown) provided in the apparatus, for fixing the jig in a desired position relative to the apparatus. In the embodiment shown, pins 8, 8 are conventional single-pole male electrical connector pins insertable into complementary female sockets provided in the housing openings.

As best shown in FIG. 3, the upper and lower end portions of the sliding bars are provided with stops 9 to prevent the bars from intentionally separating from the frame.

In use, set screw 6 may be released and the jig inverted, so that all of the bars slide down until their bottom stops 9 engage support rails 4, 4. In this position, set screw 6 is again tightened. Thereafter, the jig is returned to an upright position and is positioned on the apparatus by inserting pins 8, 8 into their cooperative openings. Set screw 6 is again released so that bars 5 may slide downwardly to abut or contact the associated slide button aligned therewith. During this phase of the procedure, care should be taken that the falling bars do not dislodge the slide buttons from their desired positions. After all of the sliding bars have been brought into engagement with their respective slide buttons, set screw 6 is again tightened so that the contour of the setting data is stored in the jig. The jig may now be removed from the apparatus and stored for later use.

In order to subsequently reproduce the slide buttons to the position stored in jig, the slide buttons are first moved downwardly to their lowermost positions. Thereafter, the jig is remounted on the apparatus, and the slide buttons are shifted upwardly to contact the bottoms of their respective bars. Once this has occurred, the jig may be again removed from the apparatus.

The improved jig is not restricted to use with a programmer for setting parison wall thickness, but may be used with other devices having a number of juxtaposed setting buttons adapted for movement along parallel paths. Devices of this kind are typically found in audio studios for setting a plurality of amplifier and tone control parameters.

Therefore, while a preferred embodiment of the improved jig has been shown and described, persons skilled in this art will readily appreciate that various changes and modifications may be made without departing from the spirit of the invention, as defined by the following claims.

What is claimed is:

1. A jig for storing setting data of an apparatus, said apparatus having a plurality of adjacent settable sliding members the relative positions of which determine said sitting data, said apparatus also having a plurality of alignment holes, said jig comprising:

a frame;

a plurality of alignment pins mounted on said frame and adapted to be selectively inserted into said alignment holes such that said jig may be repeatedly repositioned on said apparatus at a desired location;

a plurality of bars mounted on said frame, said bars being positioned adjacent one another for independent sliding movement relative to said frame along parallel paths, each of said bars having an end face aligned with and arranged to be selectively contacted by a corresponding setting member; and clamp means mounted on said frame and arranged to releasably hold said bars in desired relative positions.

2. A jig as set forth in claim 1 wherein said frame includes a pair of spaced parallel rails, and wherein the direction of said parallel paths is substantially perpendicular to the direction of elongation of said rails.

3. A jig as set forth in claim 1 wherein said clamping means includes a threaded member arranged to exert a selective force on said bars in a direction substantially parallel to the duration of elongation of said rails.

4. A jig as set forth in claim 1 wherein at least one of said pins is a male electrical connector.

5. A jig as set forth in claim 1 wherein each of said bars is provided with a stop member at either end to prevent the associated bar from unintentionally separating from said frame.

* * * * *